(12) United States Patent
Sandoval Huertas et al.

(10) Patent No.: US 9,648,897 B2
(45) Date of Patent: May 16, 2017

(54) HEALTHY FOOD COMPOSITIONS HAVING GEL OR FOAM TEXTURES AND COMPRISING HYDROLYZED EGG PRODUCTS

(71) Applicants: Mario Sandoval Huertas, Humanes de Madrid (ES); Marta Miguel Castro, Madrid (ES); Marta Garces Rimon, Madrid (ES); Rosina Lopez Fandiño, Madrid (ES)

(72) Inventors: Mario Sandoval Huertas, Humanes de Madrid (ES); Marta Miguel Castro, Madrid (ES); Marta Garces Rimon, Madrid (ES); Rosina Lopez Fandiño, Madrid (ES)

(73) Assignees: Consejo Superior De Investigaciones Cienfificas, Madrid (ES); Mario Sandoval Huertas, Madrid (ES)

( * ) Notice: Subject to any disclaimer, the term of this patent is extended or adjusted under 35 U.S.C. 154(b) by 0 days.

(21) Appl. No.: 14/566,363

(22) Filed: Dec. 10, 2014

(65) Prior Publication Data
US 2015/0173394 A1  Jun. 25, 2015

(30) Foreign Application Priority Data
Dec. 20, 2013  (ES) .................................. 201331886

(51) Int. Cl.
| | | |
|---|---|---|
| A23J 1/08 | (2006.01) |
| A23J 3/34 | (2006.01) |
| A23L 33/18 | (2016.01) |
| A23C 20/02 | (2006.01) |
| A23G 3/44 | (2006.01) |
| A23G 3/52 | (2006.01) |
| A23P 30/40 | (2016.01) |
| A23L 9/10 | (2016.01) |

(52) U.S. Cl.
CPC ................. *A23J 1/08* (2013.01); *A23C 20/02* (2013.01); *A23G 3/44* (2013.01); *A23G 3/52* (2013.01); *A23J 3/341* (2013.01); *A23L 9/12* (2016.08); *A23L 33/18* (2016.08); *A23P 30/40* (2016.08)

(58) Field of Classification Search
CPC ....................................................... A23J 1/08
USPC .......................................................... 426/63
See application file for complete search history.

(56) References Cited

U.S. PATENT DOCUMENTS 3,889,001 A * 6/1975 Buide .................... A23G 9/363
426/565
2009/0029005 A1  1/2009  Van Amerongen et al.

FOREIGN PATENT DOCUMENTS

| EP | 1867237 A1 | 12/2007 |
| EP | 2106706 A1 | 10/2009 |
| JP | 2003/052336 A | 9/2014 |
| WO | WO 2012/146717 A1 | 11/2012 |

OTHER PUBLICATIONS

Hammershoj, M. et al. Food Res. Internat. 41:522-531 (2008).*
Spanish Search Report issued by the International Searching Authority (ISA/O.E.P.M) on Sep. 25, 2014 in connection with International Application No. P 201331886.
Chen et al. (2012) "Influence of Degree of Hydrolysis on Functional Properties, Antioxidant and ACE Inhibitory Activities of Egg White Protein Hydrolysate". Food Sci. Biotechol. 21(1):27-34.
Chen et al. (2012) "Antioxidant, ACE Inhibitory Activities and Functional Properties of Egg Whire Protein Hydrolysate". J. Food Biochem. 36:383-394.
Damrongaskkul et al. (2008) "Ensymatic Hydrolysis of Rawhide Using Papain and Neutrase". J. Industrial and Eng. Chem. 14:202-206.
Foegeding et al. (2006) "Factors Determining the Physical Properties of Protein Foams". Food Hydrocolloids. 20:284-292.
Foegeding et al. (2011) "Food Protein Functionality: A Comprehensive Approact". Food Hydrocolloids. 25:1853-1864.
Klompong et al. (2007) "Antioxidative Activity and Functional Properties of Protein Hydrolysate of Yellow Stripe Trevally (*Selaroides leptolepis*) as Influenced by the Degree of Hydrolysis and Enzyme Type". Food Chemistry. 102(4):1317-1327.
Mine (1995) "Recent Advances in the Understanding of Egg White Protein Functionality". Trends in Food Sci. & Tech. 6(7):225-232.
Rocharake et al. (2003) "Exopeptidases and Their Application to Reduce Bitterness in Food: A Review". Food Sci. and Nutrition. 43(4):401-445.
Tavano (2013) "Protein Hydrolysis Using Proteases: An Important Tool for Food Biotechnology". J. Molecular Catalysis B: Enzymatic. 90:1-11.
Totosaus et al. (2002) "Review of Physical and Chemical Protein-Gel Induction". Intl. J. Food Sci. & Tech. 37:589-601.

* cited by examiner

*Primary Examiner* — Hamid R Badr
(74) *Attorney, Agent, or Firm* — Gary J. Gershik; Cooper & Dunham LLP (57) ABSTRACT

The invention relates to healthy food compositions with a gel or foam texture that have antioxidant properties, are rich in proteins, low-fat, lactose- and casein-free and easy-to-chew, comprising a neutral-flavored egg hydrolysate as a basic ingredient.

These compositions are presented as an alternative to sweet and salty dishes using dairy products as a base because they have similar flavor, appearance and texture characteristics. These compositions are also presented as new foods that are particularly indicated for being consumed by people who are lactose intolerant or who have obesity issues.

19 Claims, 4 Drawing Sheets

HEALTHY FOOD COMPOSITIONS HAVING GEL OR FOAM TEXTURES AND COMPRISING HYDROLYZED EGG PRODUCTS

FIELD AND OBJECT OF THE INVENTION

The present invention is comprised in the food sector, as it specifically relates to healthy food compositions that have antioxidant properties, are rich in high biological value proteins, low-fat and lactose- and casein-free, comprising egg hydrolysates and having techno-functional characteristics similar to those of sweet and salty dishes using dairy products as a base.

STATE OF THE ART

Products with gel and foam textures have an increasingly more predominant position in current cuisine and are very widespread in the field of sweet culinary specialties and desserts, but also in the field of salty dishes.

In addition to their techno-functional characteristics and nutritional content, such products are desirable and very appealing for any sector of the population, and they are primarily indicated for people with special food requirements, such as, for example, those people with "mechanical" chewing and/or swallowing difficulties.

There are various circumstances relating to chronic or temporary illness which lead people to not include or remove cow's milk, cow milk products and all products including this food from their daily diet. Casein allergies and lactose intolerance are the most common conditions. The lack of lactase causes lactose intolerance, a relatively frequent anomaly particularly in the elderly. Specifically, lactose intolerance is the most common genetic disorder among humans, affecting over 50% of the world population.

Different alternatives which enable consumers who have to eliminate milk from their diet to consume sweet and salty dishes with gel or foam textures and which essentially use fats, protein sources and additives as basic ingredients are considered in the state of the art.

The inclusion of proteins and/or additives is what usually allows obtaining products having techno-functional characteristics (flavor, texture, smell, level of acidity, suitable rheological properties, stability and appearance) that are similar to those of products using milk or dairy products in their composition. However, the inclusion of additives complicates the preparation process and is the reason why the end product is perceived by consumers as a rather unhealthy food.

Document WO2004/030464 A1 relates to liquid or powdered creamer compositions, comprising a first combination of ingredient components consisting of a fat or oil component, a microparticulated protein component and optionally a carbohydrate component; and a second combination of ingredient components consisting of an emulsifier, a bulking agent and other components as well. The microparticulated protein component includes denatured egg white albumin which, however, makes it necessary to control temperatures and to use high sheering forces to prevent aggregate particle formation or to have to add additional ingredients such as lecithin, xanthan gum, maltodextrins, sugars, carrageenans or alginates.

Document WO2004/021804 A1 relates to a cooking cream having good whipping capability, comprising a majority percentage of water, fat, protein (including egg proteins), starch, emulsifier, and preferably a stabilizer and a buffer.

Document WO2004/084656 A1 relates to whippable products comprising water, fat, emulsifiers, stabilizers, proteins, hydrophilic colloids and flavoring agents.

In turn, document GB784555 (A) relates to a dry powder product, comprising an edible orthophosphate, an edible pyrophosphate, an edible calcium salt, a thickener and other additional flavoring agents, which is mixed with milk or water and allows preparing puddings, chiffon and custard desserts.

Spanish patent P2409086 relates to a fruit dessert with a flan texture and to the method for obtaining it, comprising at least two layers of products based on fruit and flavoring and texturizing agent additives, having the form and texture of an egg- and milk-based flan such as those that are widely known, but it does not contain egg or milk.

Eggs are a basic food in the diet given their nutritional properties. They stand out given their high content in essential nutrients, which are furthermore bioavailable, and given the fact that they provide other elements, such as antioxidants and unsaturated fats. Eggs are one of the most protein-rich foods, and furthermore their proteins provide all the essential amino acids in the exact proportions required by the body for optimal growth and for maintaining metabolically active lean tissue. Eggs contain about 12% by weight of proteins, egg whites contain about 11% by weight of proteins, and egg yolks contain about 16% by weight of proteins. Another important advantage is their low fat content; egg whites have no fats and whole eggs and yolks have about 10.5% and 26% by weight of proteins, respectively. All this justifies the presence of this food in the context of a balanced diet, unless there is any circumstance that advises against it, such as egg allergies. In addition to their organoleptic properties, eggs are also a highly gastronomically versatile food providing a wide range of functional properties that are greatly appreciated in cooking.

The capacity of eggs to form and stabilize different structures in foods is due to the fraction of proteins and their physicochemical properties (Y. Mine. Recent advances in the understanding of egg white protein functionality. Trends in Food Science and Technology, 1995, 6: 225-232). Hydrolysis, or peptide bond breaking, can change said properties in three ways: by decreasing molecular weight, by increasing the number of ionizable groups and by causing the exposure of hydrophobic groups. Enzymatic hydrolysis therefore improves food protein solubility in a broad pH range and modulates their surface or interface properties essential for foam and emulsion stabilization (E. A. Foegeding and J. P. Davis. Food protein functionality: a comprehensive approach. Food Hydrocolloids, 2011, 25: 1853-1864). The length and characteristics of formed peptides as regards their constituent amino acids, the presence of polar ionizable groups and their hydrophobicity determine the resulting functional properties, depending not only on the degree of hydrolysis but also on enzyme specificity and on the characteristics of the protein used as a substrate (V. Klompong, S. Benjakul, D. Kantachote, F. Shahidi. Antioxidative activity and functional properties of protein hydrolysate of yellow stripe trevally (*Selaroides leptolepis*) as influenced by the degree of hydrolysis and enzyme type. Food Chemistry, 2007, 102: 1317-1327).

Food gel formation, i.e., the transformation of a fluid to a solid through the formation of a macromolecular network, requires native proteins to unfold and re-associate by means of covalent and non-covalent interactions, which has conventionally been achieved by means of applying heat (A. Totosaus, J. G. Montejano, J. A. Salazar, I. Guerrero. A review of physical and chemical protein-gel induction. International Journal of Food Science and Technology. 2002. 37: 589-601). In this sense, the factors influencing the gelling capacity of proteins can be divided among those which determine gel formation and those which influence the physical properties of the gel. Enzymatic hydrolysis usually has a negative effect on the gelling capacity of proteins as it reduces their size. Therefore, collagen hydrolysis with papain, giving rise to intermediate-sized peptides, produces a gelatin with sufficient firmness and viscosity, whereas neutrase does not allow gel formation (S. Damrongsakkul, K. Ratanathammapan, K. Komolpis, W. Tanthapanichakoon. Enzymatic hydrolysis of rawhide using papain and neutrase. Journal of Industrial and Engineering Chemistry. 2008. 14: 202-206).

On the other hand, the basic properties which make proteins good foaming agent are their capability to: (1) be rapidly adsorbed into air-water interfaces while whipping; (2) experience a rapid conformational change in the interface; and (3) form a cohesive viscoelastic film through intermolecular interactions. They therefore contribute to the three different phases, i.e., formation, stability and consumption, which are characteristic of foam-containing foods. It is important to consider all these characteristics because many food products, for example, are based on wet foams that are transformed into dry foams in their final structure (as in the case of meringues and sponge cakes). Whey proteins can therefore replace egg white proteins in foaming applications except in those which involve heating or baking because they have a different thermal stability (E. A. Foegeding, P. J. Luck, J. P. Davis. Factors determining the physical properties of protein foams. Food Hydrocolloids, 2006, 20, 284-292). The foregoing illustrates that the structural responses of proteins when mixed with other ingredients, heating and drying are also essential for their functionality. As regards foaming properties, papain (C. Chen, Y. J. Chi. Antioxidant, ACE inhibitory activities and functional properties of egg white protein hydrolysate. Journal of Food Biochemistry, 2012, 36: 383-394) and trypsin (C. Chen, Y. J. Chi, M. Y. Zhao, W. Xu. Influence and degree of hydrolysis on functional properties, antioxidant and ACE inhibitory activities of egg white protein hydrolysate) have recently been used to obtain egg white hydrolysates having better foaming capacity and foam stability than starting egg whites do.

Improved thermal stability of egg white proteins by means of enzymatic hydrolysis (JP58155048), improved thermal stability of egg yolk proteins (JP3051744B), improved clarity and transparency of the appearance of a product used as a source of amino acids (JP2007053932) or improved clarity and transparency of a gelling product (JP6058056) have also been reported within patent literature.

Enzymatic protein hydrolysis processes involve a change in food properties (related to digestibility, nutritional quality, sensory quality (such as texture and flavor) and health benefits due to the formation of bioactive peptides or the reduction of allergens) that are of interest as a strategy when preparing foods with gel or foam textures; however, enzymatic hydrolysis does not always evidently lead to an improvement in said properties which in many cases may be negatively affected (O. L. Tavano. Protein hydrolysis using proteases: an important tool for biotechnology. Journal of Molecular Catalysis B: Enzymatic. 2013, 90: 1-10).

On the other hand, a problem that is commonly associated with protein hydrolysate production is the occurrence of bitter flavors, depending on the size, sequence, and, essentially, hydrophobicity of the peptide-forming amino acids, especially amino acids such as valine, leucine, isoleucine, phenylalanine, tyrosine and tryptophan.

The inventors have surprisingly been able to solve the bitterness problem in protein hydrolysates with the present invention and have developed new compositions with a gel or foam texture comprising a neutral-flavored egg hydrolysate.

OBJECT OF THE INVENTION

In a first aspect, the present invention relates to a healthy food composition with a gel or foam texture that is lactose- and casein-free, comprising a neutral-flavored egg protein hydrolysate obtainable by a method comprising the following steps:
  a) acidifying an egg product pH with a concentrated food grade acid to a pH of between 5.0 and 7.0,
  b) adding an aminopeptidase in an amount of between 1 and 3 g per liter of egg product,
  c) incubating at a temperature of between 45 and 55° C. for a time period of between 30 and 180 minutes, and
  d) inactivating the aminopeptidase at a temperature of between 85 and 95° C. and for a time period of between 10 and 15 minutes.

In a second aspect, the present invention relates to a method for preparing a neutral-flavored egg hydrolysate, comprising steps a), b), c) and d) described in the first aspect of the invention.

In a third aspect, the present invention relates to a method for preparing a healthy food composition with a gel texture that is lactose- and casein-free, comprising steps a), b), c) and d) described in the first aspect of the invention, and wherein, before or after the step d), comprises a step c1) or d1), respectively, of adding a flavoring agent and stirring the mixture for a period of between 1 and 15 minutes.

In a fourth aspect, the present invention relates to a method for preparing a healthy food composition with a gel texture that is lactose- and casein-free, comprising the steps a), b), c) and d) described in the first aspect of the invention, and wherein, before or after the step d), comprises a step c1) or d1), respectively, of adding a flavoring agent and, after step d) or d1), respectively, comprises the step:
  e) centrifuging at least at 2500 g for a time period of between 10 and 20 minutes and collecting the precipitate.

In a fifth aspect, the present invention relates to a method for obtaining a healthy food composition with a foam texture that is lactose- and casein-free, comprising steps a), b), c) and d) described in the first aspect of the invention, wherein the egg product is egg white and wherein, before or after the step d), comprises a step c1) or d1), respectively, of adding a flavoring agent and, after step d) or d1), respectively, comprises steps:
  e) centrifuging at least at 2500 g for a time period of between 10 and 20 minutes and collecting the supernatant, and
  f) whipping the supernatant collected in step e) for a time period of between 25 seconds and 15 minutes.

In a sixth aspect, the present invention relates to the use of a food composition according to the first aspect of the invention as a food ingredient.

In a seventh aspect, the present invention relates to a food product comprising a food composition according to the first aspect of the present invention.

Other objects, features, advantages and aspects of the present application will be evident for the person skilled in the art based on the following description and attached claims.

DESCRIPTION OF THE INVENTION

In the context of the present invention, the definitions of the different terms used are those that are well-known by the person skilled in the art and widely described in the state of the art, unless otherwise indicated.

In a first aspect, the present invention relates to a healthy food composition with a gel or foam texture that is lactose- and casein-free, comprising a neutral-flavored egg protein hydrolysate obtainable by a method comprising the following steps:
 a) acidifying an egg product pH with a concentrated food grade acid to a pH of between 5.0 and 7.0,
 b) adding an aminopeptidase in an amount of between 1 and 3 g per liter of egg product,
 c) incubating at a temperature of between 45 and 55° C. for a time period of between 30 and 180 minutes, and
 d) inactivating the aminopeptidase at a temperature of between 85 and 95° C. and for a time period of between 10 and 15 minutes.

The healthy food compositions with a gel or foam texture that are lactose- and casein-free, hereinafter food compositions of the invention, comprise a neutral-flavored egg protein hydrolysate as a basic ingredient. The food compositions of the invention have antioxidant properties, are rich in proteins and low-fat.

The antioxidant properties of the food compositions of the invention can contribute to delaying the oxidation process involved in consumer body deterioration and is related to cardiovascular diseases, neurological diseases, endocrine diseases, respiratory diseases, diseases of an immune and autoimmune origin, ischemia, stomach disorders, carcinogenesis and tumor progression. Additionally, they can also contribute to reducing food deterioration (lipid oxidation) resulting in altered aroma, flavor (rancidity) and color, in the loss of specific nutrients and in the formation of potentially hazardous substances, which may affect not only food quality but also food consumption safety.

The "egg protein hydrolysate" comprised in the food compositions of the invention is characterized by its neutral flavor and by the fact that it does not generate an aftertaste which is derived from the use of suitable enzymes during the hydrolysis process. As mentioned previously, the production of protein hydrolysates causes the occurrence of bitter flavors, depending on the size, sequence, and, essentially, hydrophobicity of the peptide-forming amino acids, particularly, valine, leucine, isoleucine, phenylalanine, tyrosine and tryptophan. Although the use of exopeptidases for catalyzing peptide bond hydrolysis is known to reduce bitterness (R. Raksakulthai and N. F. Haard, Exopeptidases and their application to reduce bitterness in food: A review, Critical Reviews in Food Science and Nutrition. 2003. 43: 401-445), the egg product used in the present invention obtains, for the first time, food compositions which do not reproduce that bitterness.

Examples of enzymes that get the food compositions of the invention to not reproduce bitterness are aminopeptidases of *Aspergillus oryzae*, or the alcalase derived from *Bacillus licheniformis*.

Food compositions with a "gel texture" are understood to be solid or semi-solid products obtained from a colloidal suspension in which a network of very small interconnected particles coagulates the volume of a liquid medium. Gels have a density similar to liquids, and nonetheless their structure is more similar to a solid.

Food compositions with a "foam texture" are understood to be colloidal suspensions of a gas in a liquid that consist of tiny bubbles, having a creamy texture, a spongy consistency, and being easy on the palate, and they are obtained by introducing a certain amount of air into a liquid preparation by means of mechanical stirring, without having to add a specific amount of fat or compressed air.

In the scope of the invention, the egg product is a chicken egg, although eggs from other poultry species comprising suitable proteins which allow obtaining the same results are also included. Examples of other usable eggs are quail egg, turkey egg, duck egg, pheasant egg and ostrich egg. Therefore, in a particular embodiment of the invention, the egg product is selected from the group consisting of a chicken egg, quail egg, turkey egg, duck egg, pheasant egg, ostrich egg and mixtures thereof. In a preferred embodiment, the egg product is a chicken egg.

In the context of any of the aspects of the present invention, the egg product is a whole egg, an egg white or an egg yolk. The whole egg, egg white or egg yolk can be used directly in liquid state, or it can be used in the form of a rehydrated (previously dehydrated and then rehydrated) raw or pasteurized product.

The food compositions of the invention can have technofunctional characteristics similar to those of some sweet and salty dishes with gel textures using dairy products as a base if, before or after the step of inactivating the aminopeptidase of step d), one or several flavoring agents is added to the neutral-flavored egg protein hydrolysate and the mixture is stirred for a time period comprised between 1 and 15 minutes. Therefore, in a particular embodiment of the first aspect of the invention, the composition of the present invention has a gel texture, and a flavoring agent is added and the mixture stirred for a period of between 1 and 15 minutes before or after step d). In a preferred embodiment, a flavoring agent is added and the mixture stirred for a period of between 1 and 15 minutes before step d).

In the scope of the present invention, the expression "techno-functional characteristics similar to those of some sweet and salty dishes with gel or foam textures using dairy products as a base" means that the food compositions of the invention can replace said products, taking into account texture and appearance characteristics, and particularly flavor, texture and appearance characteristics.

"Flavoring agent" is understood to be any ingredient capable of acting, though not exclusively, on the senses of taste and smell, either for strengthening the characteristic (inherent) taste and smell of the food, or transmitting to it a specific flavor and/or aroma. They are usually products in liquid, powder or paste state, and they can also be defined as substance concentrates. The flavoring agent of the present invention is non-dairy based to thus prepare a food composition that is casein- and lactose-free. One or several flavoring agents can be added. Examples of flavoring agents providing a salty or sweet taste are salt and sucrose, respectively, but other non-nutritional sweetening agents or sweetening agents that slowly raise blood sugar, such as stevia, fructose or aspartame, allow obtaining functional foods suitable for diabetics. Any other type of sweetening agent such as xylitol, sorbitol, maltitol, fructose and galactooligosaccharides can be used. Low-calorie and preferably natural sugar substitutes. Lyophilized, powdered or infusion-type coloring agents or flavorings or fruit or vegetable purees and pulps are also examples of flavoring agents.

As the person skilled in the art will understand, food texture is one of the primary attributes which, together with color, flavor and smell, contribute to sensory quality of foods. Furthermore, it is the characteristic of quality that is most valued by consumers, and its related properties are characterized by being hard to define because they are subjective characteristics. To evaluate food texture, most experts use the "Texture Profile Analysis" (TPA) method which allows objectively measuring this parameter and imitates the chewing process. This analysis obtains the profile of the force that must be applied to chew products by subjecting a sample of the product on two consecutive occasions to a force that is similar to the biting strength of the jaw, and 7 measurable textural parameters, such as hardness (kg m s$^{-2}$), elasticity (adimensional), stickiness (kg m$^2$ s$^{-2}$), cohesiveness (adimensional), gumminess (kg m s$^{-2}$), chewiness (kg) and resilience (adimensional), are extracted from this.

In a particular embodiment of this food composition with a gel texture, the egg product is liquid whole egg, and the composition is characterized by a hardness of less than 1.1 kg m s$^{-2}$, elasticity of less than 0.73, stickiness of more than $-106$ kg m$^2$ s$^{-2}$, cohesiveness of less than 0.39, gumminess of less than 0.42 kg m s$^{-2}$, chewiness of less than 0.31 kg and resilience of less than 0.11. This composition is similar to a crème pâtissière including dairy products in its composition. In a preferred embodiment of this composition, sugar in a proportion of between 10 and 30 grams for every 100 ml of egg product, and a caramel or vanilla infusion in a proportion of 100 ml for every 250 ml of egg product are used as flavoring agents. And, in a more preferred embodiment, said flavoring agent is added and the mixture stirred before step d).

In another particular embodiment of the food composition with a gel texture, the egg product is liquid egg yolk and the composition is characterized by a hardness of less than 0.97 kg m s$^{-2}$, elasticity of less than 0.95, stickiness of more than $-371$ kg m$^2$ s$^{-2}$, cohesiveness of less than 0.8, gumminess of less than 0.78 kg m s$^{-2}$, chewiness of less than 0.74 kg and resilience of less than 0.024. This composition is similar to a conventional Spanish dessert named tocino de cielo. In a preferred embodiment, sugar in a proportion of between 10 and 30 grams for every 100 ml of egg product and a caramel or cinnamon infusion in a proportion of 100 ml for every 250 ml of egg product are used as flavoring agents. And, in a more preferred embodiment, said flavoring agent is added and the mixture stirred before step d).

In another particular embodiment of the food composition with a gel texture, the egg product is liquid egg white. This composition is similar to a junket including dairy products in its composition. In a more particular embodiment, the flavoring agent is sugar in a proportion of between 10 and 30 grams for every 100 ml of egg product or salt in a proportion of 2 g for every 350 ml of egg product. In another particular embodiment, the flavoring agent comprises sugar and additionally a lemon-lime or honey infusion in a proportion of 100 ml for every 250 ml of hydrolysate. In another particular embodiment, the flavoring agent comprises salt and additionally a beet or basil infusion in a proportion of 100 ml for every 250 ml of hydrolysate. And, in a preferred embodiment, the flavoring agent is added and the mixture stirred before step d).

The food compositions of the invention can also have techno-functional characteristics similar to those of some sweet and salty dishes with gel textures using dairy products as a base if before or after the step of inactivating the aminopeptidase of step d), one or several flavoring agents is added to the neutral-flavored egg protein hydrolysate, and it is subsequently centrifuged at least at 2500 g for a time period of between 10 and 20 min, and the precipitate is collected. Therefore, in another particular embodiment of the first aspect of the invention, the composition of the present invention has a gel texture, and before or after step d) a flavoring agent is added and subsequently, after step d) or after adding the flavoring agent, respectively, the product obtained is centrifuged at least at 2500 g for a time period of between 10 and 20 minutes and the precipitate is collected. In a preferred embodiment of this composition with gel texture, a flavoring agent is added before the step d), and subsequently, after step d), the product obtained in step d) is centrifuged at least at 2500 g for a time period of between 10 and 20 minutes and the precipitate is collected. In any of the embodiments of this composition with gel texture, the centrifugation is carried out, in a preferred manner, at between 2500 and 6000 g, and in an even more preferred embodiment, the centrifugation is carried out at 2500 g.

In a particular embodiment according to the preceding paragraph, the food composition of the invention has a gel texture, the precipitate is obtained after centrifugation, and it comprises liquid whole egg as the egg product. This composition is similar to a flan including dairy products in its composition. In a preferred embodiment of this composition, sugar in a proportion of between 10 and 30 grams for every 100 ml of egg product and a caramel or vanilla infusion in a proportion of 100 ml for every 250 ml of egg product are used as flavoring agents. And, in an even more preferred embodiment, the flavoring agent is added before step d). In another particular embodiment according to the preceding paragraph, the food composition of the invention has a gel texture, the precipitate is obtained after centrifugation, and it comprises liquid egg white as the egg product, characterized by a hardness of less than 6.32 kg m s$^{-2}$, elasticity of less than 0.81, stickiness of more than $-263$ kg m$^2$ s$^{-2}$, cohesiveness of less than 0.57, gumminess of less than 3.2 kg m s$^{-2}$, chewiness of less than 2.4 kg and resilience of less than 0.20. This composition is similar to a fresh cheese including dairy products in its composition. In a preferred embodiment, sugar in a proportion of between 10 and 30 grams for every 100 ml of egg product or salt in a proportion of 2 g for every 350 ml of egg product is used as a flavoring agent, and, in an even more preferred embodiment, said flavoring agent is added before step d).

The food compositions of the invention can also have improved techno-functional characteristics with respect to some sweet and salty dishes with foam textures using dairy products as a base, if the egg product is egg white and after the centrifugation the supernatant is collected and whipped for a time period of between 25 seconds and 15 minutes. Therefore, in a particular embodiment of the first aspect of the invention, the composition of the present invention has a foam texture, the egg product is egg white and before or after step d) a flavoring agent is added, and after step d) or after adding the flavoring agent, respectively, the product obtained is centrifuged at least at 2500 g for a time period of between 10 and 20 minutes, and the supernatant is collected and whipped for a time period of between 25 seconds and 15 minutes. In a particular embodiment, the supernatant is whipped for between 1 is whipped and 15 minutes and in another particular embodiment it is whipped for between 2 and 15 minutes. In any of these embodiments, the centrifugation is carried out, in a preferred manner, at between 2500 and 6000 g, and in an even more preferred embodiment, the centrifugation is carried out at 2500 g. In a particular embodiment, the centrifugation is carried out at 2500 g and the supernatant is whipped for 1 to 15 minutes. In another particular embodiment, the centrifugation is carried out at 2500 g and the supernatant is whipped for 2 to 15 minutes. In a preferred embodiment of any of the previous embodiments, the flavoring agent is added before step d). In another preferred embodiment of any of the previous embodiments, the egg product is liquid egg white.

Figure 7:
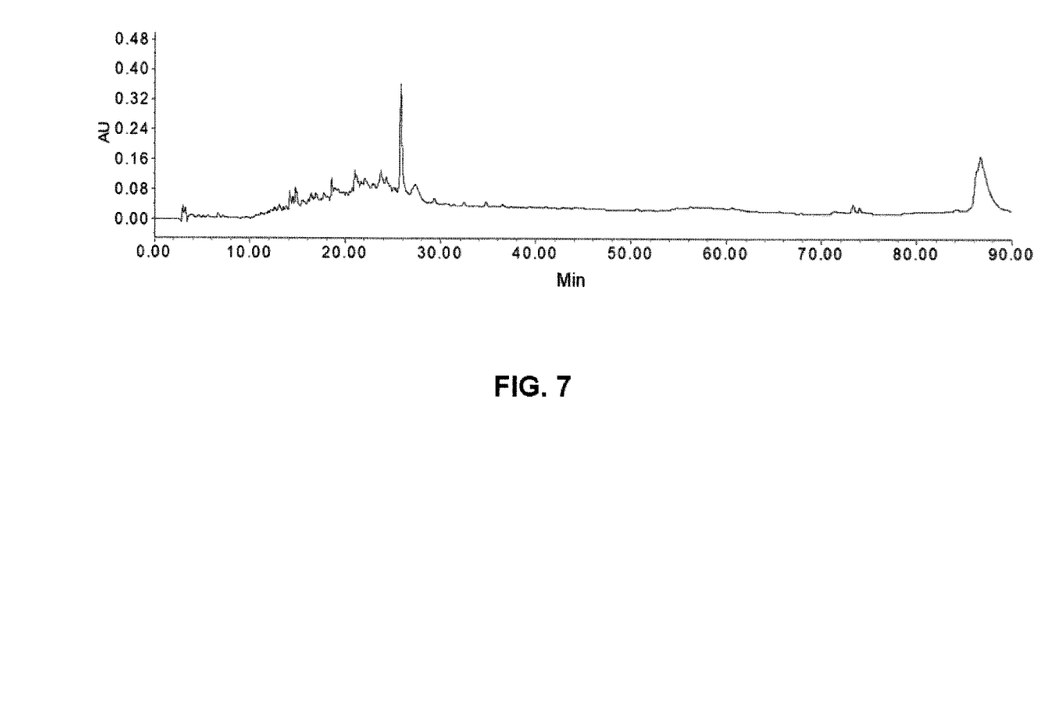
FIG. 7 shows the chromatographic profile obtained using reverse-phase high-performance liquid chromatography (RP-HPLC) on an analytical scale of the supernatant of the egg white hydrolysate with aminopeptidase of *Aspergillus oryzae* for 60 minutes. Time is represented on the x-axis in minutes.

The food composition of the invention with foam texture; has improved techno-functional characteristics with respect to some sweet and salty dishes with foam textures using dairy products as a base, and is characterized by a drain volume of less than 50% and by having the capacity of being beaten again; and a peptide profile characterized by having a degree of hydrolysis greater than 70% which is evaluated using ovalbumin as the reference protein and comparing the chromatogram of the non-hydrolyzed egg white with the chromatogram of the obtained hydrolysate; and it is characterized in that most of the peptides making up the food composition elute in retention times of between 14 and 28 minutes.

In a preferred embodiment of the composition with foam texture, the egg product is liquid egg white and the flavoring agent is sugar in a proportion of between 10 and 30 grams for every 100 ml of egg product or salt in a proportion of 2 g for every 350 ml of egg product, and in a more preferred embodiment the flavoring agent is added before step d).

Figure 6:
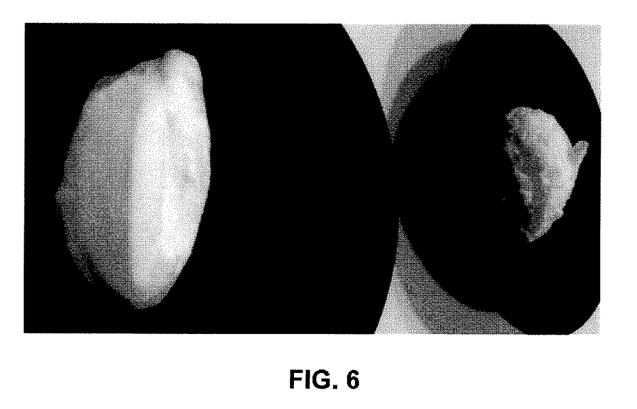
FIG. 6 shows the foam produced after whipping the supernatant derived from the egg white hydrolysate obtained upon adding sugar at the end of hydrolysis (on the left), and foam obtained after whipping the egg white with sugar (on the right).

The composition of the invention with foam texture, can be beaten in less time than the non-hydrolyzed egg white. Furthermore, it has improved foaming properties with respect to foam obtained from non-hydrolyzed egg white, specifically it has greater foaming capacity. As mentioned above, the composition with a foam texture of the invention can also be beaten again after a prolonged time, even 24 hours, has passed, so the initially obtained light foam is recovered, whereas the foam obtained from non-hydrolyzed egg white lacks this capacity (Table 2).

In another particular embodiment, the food compositions of the invention according to any one of the particular embodiments of the first aspect of the invention described in the preceding paragraphs are lyophilized. The food lyophilized compositions of the invention are lighter and spongier and less lumpy and compact than those that are obtained from non-hydrolyzed and non-lyophilized liquid egg yolks or whole eggs. Thus, the first aspect of the invention also refers to any one of the compositions described in the preceding paragraphs which are lyophilized.

The invention according to the first aspect also relates to a composition according to any one of the particular embodiments described in the preceding paragraphs, where the aminopeptidase is an aminopeptidase of *Aspergillus oryzae*. Said enzyme is preferably Flavorpro®, and more preferably Flavorpro® 750MDP (F750MDP of Biocatalysts (Cardiff, United Kingdom)).

Likewise, the invention according to the first aspect also relates to any one of the particular embodiments described in the preceding paragraphs, where in step c) the incubation is performed for a time period of between 45 and 120 minutes, and in a preferred manner for 45, 90, 100 or 120 minutes.

The first aspect of the invention furthermore relates to compositions according to any one of the particular embodiments described in the preceding paragraphs, where in step a) the egg product is acidified until reaching pH 5.5 with 37% food grade HCl, in step b) the aminopeptidase is from *Aspergillus oryzae* and is added in a proportion of 2 g per liter of egg product, in step c) the incubation is performed at 50° C. for a time period of between 45 and 120 minutes, and in step d) the aminopeptidase of *Aspergillus oryzae* is inactivated by heating at 95° C. for 10 minutes.

The particular conditions in the last three paragraphs are optimal for obtaining compositions with gel or foam textures that emulate the textures of food products made with milk or milk derivatives, and also, surprisingly, have improved techno-functional properties.

Therefore, taking into account the foregoing, according to the first aspect of the invention, the present invention is based on the use of an egg hydrolysate and, optionally, on the use of non-dairy based flavoring agents, which allows obtaining healthy food compositions that have antioxidant properties, are rich in high biological value proteins, low-fat, and lactose- and casein-free, and which are capable of emulating or even improving the characteristics of flavor, texture and appearance of sweet and salty dishes with gel or foam textures using dairy products as a base and which can furthermore be used as ingredients in multiple preparations (Examples 1-11).

The technical advantages of the food compositions of the invention are listed below:
 they are low-fat and lactose- and casein-free healthy products which make up a high quality protein source,
 they are easy to chew and digest, unlike other conventional protein sources, such as meat, fish and poultry, making them particularly suitable for populations with some type of mechanical chewing limitation or digestibility problems,
 they require a limited number of ingredients for preparation,
 they are economical products in relation to other protein foods,
 they can be consumed by people who have an intolerance to dairy products and by people with obesity problems,
 they allow taking maximum advantage of the whole egg as well as of its yolk and white fractions, which prevents generating byproducts.

In a second aspect, the present invention relates to a method for obtaining a neutral-flavored egg hydrolysate, comprising the following steps:
 a) acidifying an egg product pH with a concentrated food grade acid to a pH of between 5.0 and 7.0,
 b) adding an aminopeptidase in an amount of between 1 and 3 g per liter of egg product,
 c) incubating at a temperature of between 45 and 55° C. for a time period of between 30 and 180 minutes, and
 d) inactivating the aminopeptidase at a temperature of between 85 and 95° C. and for a time period of between 10 and 15 minutes.

Furthermore, the second aspect of the invention also relates to the egg hydrolysate obtainable by said method. Said egg protein hydrolysate (also referred to as egg hydrolysate) surprisingly has a neutral flavor (it has no taste). Furthermore, it does not reproduce bitterness and does not generate an aftertaste. Therefore, this hydrolysate can be mixed with a number of compounds and/or ingredients for preparing different food products and/or compositions.

In a third aspect, the present invention relates to a method for obtaining a healthy food composition with a gel texture that is lactose- and casein-free, comprising the following steps:
 a) acidifying an egg product pH with a concentrated food grade acid to a pH of between 5.0 and 7.0,
 b) adding an aminopeptidase in an amount of between 1 and 3 g per liter of egg product,
 c) incubating at a temperature of between 45 and 55° C. for a time period of between 30 and 180 minutes, d) inactivating the aminopeptidase at a temperature of between 85 and 95° C. and for a time period of between 10 and 15 minutes, and wherein, before or after the step d), comprises a step c1) or d1), respectively, of adding a flavoring agent and stirring the mixture for a period of between 1 and 15 minutes.

In a particular embodiment, the method according to the third aspect of the invention comprises preceding steps a), b), c), d) and d1) in this order. In a preferred embodiment, the invention comprises preceding steps a), b), c), c1) and d) in this order. The composition obtainable by means of these methods has a texture similar to a junket prepared with dairy products when the egg product is the egg white, and a texture similar to a crème pâtissière prepared with dairy products when the egg product is the whole egg.

In a fourth aspect, the present invention relates to a method for preparing a healthy food composition with a gel texture that is lactose- and casein-free, comprising the steps a), b), c) and d) described in the third aspect of the invention, and, which, before or after the step d), comprises a step c1) or d1), respectively, of adding a flavoring agent and, after step d) or d1), respectively, comprises the step:

e) centrifuging at least at 2500 g for a time period of between 10 and 20 minutes and collecting the precipitate.

In a particular embodiment, the method according to the forth aspect of the invention comprises preceding steps a), b), c), d), d1) and e) in this order. In a preferred embodiment, the method according to the forth aspect of the invention comprises preceding steps a), b), c), c1), d) and e) in this order. In any of these embodiments, the centrifugation is carried out, in a preferred manner, at between 2500 and 6000 g, and in an even more preferred embodiment, the centrifugation is carried out at 2500 g. The composition obtainable by means of these methods has a texture similar to afresh cheese prepared with dairy products when the egg product is the egg white, and a texture similar to a flan prepared with dairy products when the egg product is the whole egg.

In a particular embodiment according to any one of the embodiments of the third and forth aspect of the invention, the flavoring agent added in step c1) or d1) is sugar added in a proportion of 10-30 g for every 100 ml of hydrolysate, or salt added in a proportion of 2 g for every 350 ml of hydrolysate. Flavoring agents or coloring agents, such as a lemon-lime or honey infusion in the case of a sweet application, or a beet or basil infusion in the case of a salty application, can also be added in a proportion of 100 ml for every 250 ml of hydrolysate.

In a fifth aspect, the present invention relates to a method for obtaining a healthy food composition with a foam texture that is lactose- and casein-free, comprising the following steps:

a) acidifying an egg product pH with a concentrated food grade acid to a pH of between 5.0 and 7.0, wherein the egg product is egg white, b) adding an aminopeptidase in an amount of between 1 and 3 g per liter of egg product, c) incubating at a temperature of between 45 and 55° C. for a time period of between 30 and 180 minutes, d) inactivating the aminopeptidase at a temperature of between 85 and 95° C. and for a time period of between 10 and 15 minutes, and wherein, before or after the step d), comprises a step c1) or d1), respectively, of adding a flavoring agent and, after step d) or d1), respectively, comprises steps:

e) centrifuging at least at 2500 g for a time period of between 10 and 20 minutes and collecting the supernatant, and f) whipping the supernatant collected in step e) for a time period of between 25 seconds and 15 minutes.

In a particular embodiment, the method according to the fifth aspect of the invention comprises preceding steps a), b), c), d), d1), e) and f) in this order. In a preferred embodiment, the method according to the forth aspect of the invention comprises preceding steps a), b), c), c1), d), e) and f) in this order. In any one of the preceding particular embodiment, in a particular embodiment in step f), the supernatant collected in step e) is whipped for between 1 and 15 minutes, and in another particular embodiment it is whipped for between 2 and 15 minutes. In any of these embodiments, the centrifugation is carried out, in a preferred manner, at between 2500 and 6000 g, and in an even more preferred embodiment, the centrifugation is carried out at 2500 g. In a particular embodiment, the centrifugation is carried out at 2500 g and the supernatant is whipped for 1 to 15 minutes. In another particular embodiment, the centrifugation is carried out at 2500 g and the supernatant is whipped for 2 to 15 minutes. In another preferred embodiment of any one of the previous embodiments of the fifth aspect, the egg product is liquid egg white. In another preferred embodiment of any one of the previous embodiments of the fifth aspect, the flavoring agent added in step c1) or d1) is sugar added in a proportion of 10-30 g for every 100 ml of hydrolysate, or salt added in a proportion 2 g for every 350 ml of hydrolysate.

In a particular embodiment of any one of the embodiments of the methods described according to the second, third, fourth and fifth aspects of the invention, the aminopeptidase is an aminopeptidase of *Aspergillus oryzae*. Said enzyme is preferably Flavorpro®, and more preferably Flavorpro® 750MDP (F750MDP of Biocatalysts (Cardiff, United Kingdom)).

In another particular embodiment of any one of the embodiments of the methods described according to the second, third, fourth and fifth aspects of the invention, in step c) the incubation is performed for a time period of between 45 and 120 minutes, and in a preferred manner for 45, 90, 100 or 120 minutes.

In another particular embodiment of any of the methods described according to the second, third, fourth and fifth aspects of the invention, in step a) the egg product is acidified until reaching pH 5.5 with 37% food grade HCl, in step b) the aminopeptidase is from *Aspergillus oryzae* and is added in a proportion of 2 g per liter of egg product, in step c) the incubation is performed at 50° C. for a time period of between 45 and 120 minutes, and in step d) the aminopeptidase of *Aspergillus oryzae* is inactivated by heating at 95° C. for 10 minutes.

The particular conditions of the methods according to the third, fourth and fifth aspects of the present invention, in particular those ones described in the preceding three paragraphs, allow obtaining compositions with gel or foam textures, emulating the textures of both sweet and salty food products, containing milk or dairy products, and surprisingly having certain improved techno-functional properties. Therefore, the third, fourth and fifth aspects of the present invention also relate to the compositions obtainable by said methods. These compositions are lactose- and casein-free. Furthermore, they have antioxidant properties, are rich in proteins and low-fat.

The food compositions of the invention can be consumed directly, be used as ingredients for other culinary preparations or can be frozen and lyophilized for later use.

Therefore, a sixth aspect of the present invention relates to the use of a food composition according to any one of the particular embodiments of the first aspect of the invention as a food ingredient. It also relates to the use of a food composition obtainable by the method according to any one of the particular embodiments of the third, fourth and fifth aspects of the invention and to the use of the egg hydrolysate obtainable by the method according to the second aspect of the invention as a food ingredient.

Finally in a seventh aspect, the present invention relates to a culinary preparation or food product comprising a composition according to any one of the particular embodiments of the first aspect of the invention. It also relates to a culinary preparation or food product comprising a composition obtainable by a method according to any one of the particular embodiments of the third, fourth and fifth aspects of the invention, and to a culinary preparation or food product comprising the egg hydrolysate obtainable by the method according to the second aspect of the invention. In any of these embodiments, if the food product does not have to be lactose- and casein-free, the food product can comprise one or several dairy-based flavoring agents.

Throughout the description and claims, the word "comprises" and variants thereof do not seek to exclude other technical features. For the person skilled in the art, other aspects, advantages and features of the invention will be inferred in part from the description and in part from the practice of the invention. The following drawings and examples are provided by way of illustration and are not meant to be limiting of the present invention.

EMBODIMENT OF THE INVENTION

EXAMPLE 1

Figure 1:
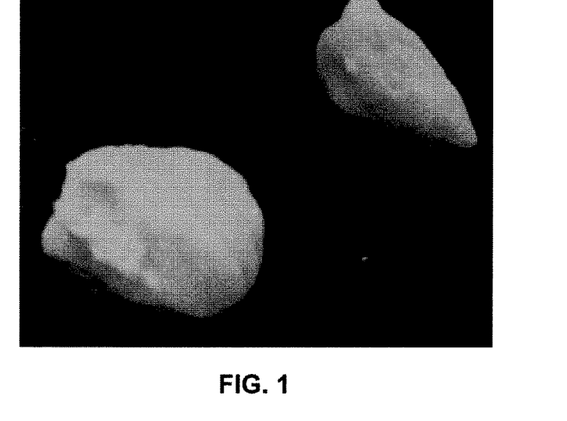
FIG. 1 shows the appearance and texture of a food composition of the invention (on the left) which is similar to a crème pâtissière including dairy products in its composition, and of a crème pâtissière prepared using traditional methods (on the right).

Food Composition of the Invention Similar to a Crème Pâtissière Including Dairy Products in its Composition Raw or pasteurized liquid whole egg, treated with a food grade aminopeptidase derived from *Aspergillus oryzae* (Flavorpro® 750 MDP, Biocatalyst), is used as the egg product. The whole egg pH is previously acidified to 5.5 with concentrated food grade HCl (37%). Then 2 g of aminopeptidase per liter of whole egg are added and it is incubated in a water bath under stirring at 50° C. for 100 minutes. Before inactivating the enzyme, sugar in a proportion of 10-30 g of sugar for every 100 ml of hydrolysate and a vanilla or caramel infusion in a proportion of 100 ml of infusion for every 250 ml of hydrolysate, respectively, are added. The mixture is stirred for 7 minutes by means of radial mechanical stirring, and then the enzyme is inactivated by means of heating at 95° C. for 10 minutes. The obtained "crème pâtissière" does not include lactose or dairy products in its composition and can be consumed as such or be used in confectionery and pastry making.

EXAMPLE 2

Figure 2:
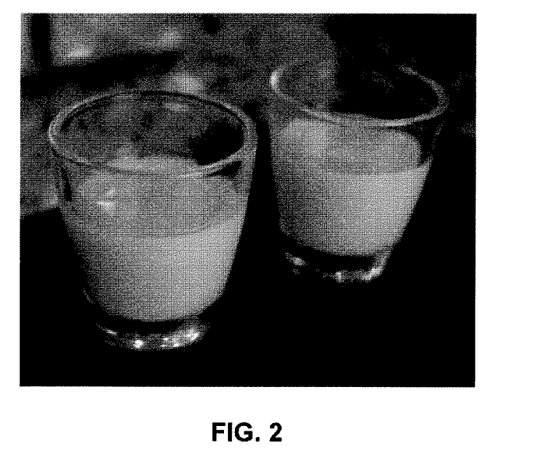
FIG. 2 shows the appearance and texture of a food composition of the invention (on the left) which is similar to a flan including dairy products in its composition, and of a flan prepared using traditional methods (on the right).

Food Composition of the Invention Similar to Flan Including Dairy Products in its Composition This example proceeds according to Example 1, but after inactivating the enzyme by means of heating at 95° C. for 10 minutes, the hydrolysate is centrifuged at 2500 rpm for 10 minutes, and the precipitate is collected. Once the supernatant phase is separated, the precipitate is a "flan" which does not include lactose or dairy products in its composition and can be consumed as such or be used in confectionery and pastry making.

EXAMPLE 3

Food Composition of the Invention Similar to Tocino De Cielo

Figure 3:
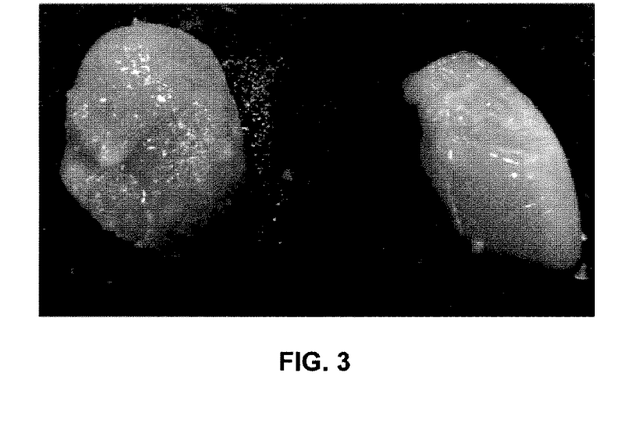
FIG. 3 shows the appearance and texture of a food composition of the invention (on the left) which is similar to tocino de cielo, and of tocino de cielo prepared using traditional methods (on the right).

Raw or pasteurized egg yolk is used as the egg product, and a method such as that indicated in Example 1 is carried out, except that before inactivating the enzyme, sugar in a proportion of 30 g of sugar for every 100 ml of hydrolysate and a cinnamon infusion in a proportion of 100 ml of infusion for every 250 ml of hydrolysate are added. This tocino de cielo is even creamier and lighter than the original tocino de cielo (prepared with non-hydrolyzed egg yolk).

EXAMPLE 4

Lyophilized Food Composition of the Invention

This example proceeds according to Examples 1, 2 or 3, but in this case the food compositions of the invention using whole egg or egg yolk as the egg product are frozen and lyophilized. An orange-yellow powder that is lighter, spongier and less lumpy and compact than powders obtained from liquid and lyophilized whole egg or egg yolk is obtained. The lyophilized products can be combined with other ingredients or components (salt, other flavoring agents, coloring agents . . . ) before or after lyophilization.

EXAMPLE 5

Figure 4:
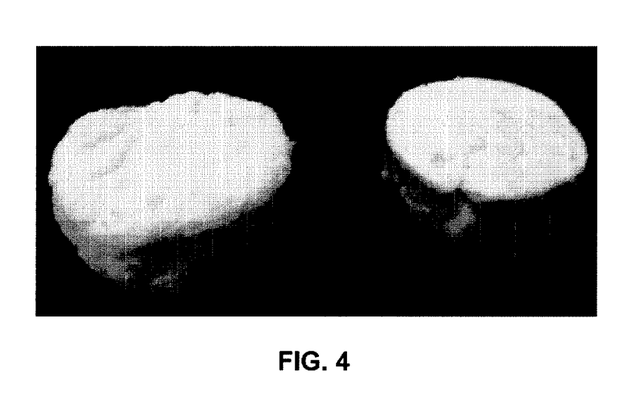
FIG. 4 shows the appearance and texture of a food composition of the invention (on the left) which is similar to a fresh cheese including dairy products in its composition, and of a fresh cheese prepared using traditional methods (on the right).

Food Composition of the Invention Similar to Fresh Cheese Including Dairy Products in its Composition Raw or pasteurized egg white is used as the egg product, and this example proceeds as described in Example 2, except that before inactivating the enzyme, sugar in a proportion of 10-30 g for every 100 ml of hydrolysate, or salt in a proportion of 2 g for every 350 ml of hydrolysate is added. Flavoring agents or coloring agents, such as a lemon-lime or honey infusion in the case of a sweet application, or a beet or basil infusion in the case of a salty application, can also be added in a proportion of 100 ml for every 250 ml of hydrolysate. After inactivating the enzyme and centrifuging, once the supernatant phase is separated, the precipitate is a fat-free "fresh cheese" that does not include lactose or dairy products in its composition, and it can be consumed as such or be used in a sweet or salty dish, having in vitro antioxidant activity of 141.7 mmol Trolox/mg protein.

EXAMPLE 6

Figure 5:
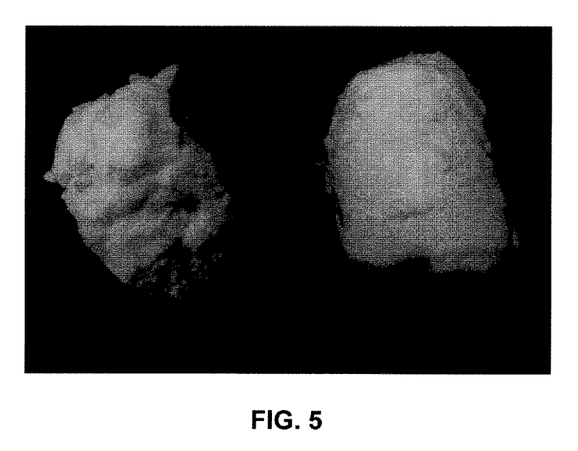
FIG. 5 shows the appearance and texture of a food composition of the invention (on the left) which is similar to a junket including dairy products in its composition, and of a junket prepared in a conventional manner (on the right).

Food Composition of the Invention Similar to Junket Including Dairy Products in its Composition This example proceeds according to Examples 5, except that after enzyme inactivation a centrifugation is not carried out and a very smooth, light and fat-free "junket" that does not include lactose or dairy products in its composition is obtained, and it can be consumed as such or be used in a salty or sweet dish.

EXAMPLE 7

Food Composition of the Invention which is a Foam

This example proceeds as in Example 5, and after centrifuging, the supernatant derived from the egg white hydrolysate is collected and whipped for 15 minutes with a manual whisk or electric beater. The resulting foam looks like bear foam, is shiny and spongier than that which is prepared from the egg white under the same conditions because it takes in more air. As a result, it is comparatively much lighter, smoother, more fluid, more uniform, more elastic, and is much more manageable for cooking. It additionally has a foam volume that is 5 times greater than that which is obtained with the same amount of original egg white under the same conditions and can be beat again after a prolonged time, even 24 hours, has passed, so the initially obtained light foam is recovered, whereas the foam obtained from non-hydrolyzed egg white lacks this capacity. This product also has high in vitro antioxidant activity of 396.5 mmol Trolox/mg protein.

In addition to its novel texture, it has a neutral flavor and is white, all of which allow mixing it with multiple natural purees, pulps, lyophilisates, coloring agents (passion fruit pulp, mango puree, carrot puree, liquefied tomato, boletus aroma, etc.) for obtaining new textures and flavors in sweet and salty dishes.

EXAMPLE 8

Food Composition of the Invention which is a Chalky Product

This example proceeds as in Example 7, and then the foam is spread on a hot table and left to dry for 12 hours at 50° C. A chalky product that comes apart in one's mouth when it comes into contact with the tongue, which is very light and appealing, is obtained, and it furthermore perfectly combines with a number of flavors given the neutral flavor of the egg white hydrolysate. This product is furthermore fat-free and does not include lactose or dairy products in its composition.

EXAMPLE 9

Obtaining a Product with a Lyophilized Texture after Egg White Hydrolysis

The same method used in Example 7 is carried out, but in this case the product derived from the egg white hydrolysate is frozen and lyophilized. A shiny, light and spongy yellow powder with the appearance of microcrystals that is less lumpy and compact than the powder obtained from lyophilized egg white is obtained. Given the neutral flavor of the egg white hydrolysate, it can be combined with other ingredients before or after lyophilization.

EXAMPLE 10

Comparison of the Texture Profiles of the Food Compositions of the Invention and Other Commercial Products In addition to the appearance and flavor, the food compositions of the invention have 2 or more values of the parameters obtained in the texture profiles similar to the original dairy-based product with which they are compared.

The TPA was carried out according to the following conditions:
- TA.XT2i Stable Micro Systems Texture Analyzer (Stable Microsystems Ltd., Surrey, England) using a 49 N load cell.
- The load cell was used at a crosshead speed of 1 mm/s
- A cylindrical flat-base plunger 35 mm in diameter.
- Pieces of samples were cut with a thickness of about 20 mm and a height of about 20 mm. The pieces are axially compressed to 40% of their original height.
- A time of 5 s was left to pass between the two compression cycles.

The results obtained are shown in Table 1.

TABLE 1

Texture profiles of some food compositions of the invention and of similar commercial products

| | Hardness (kg m s$^{-2}$) | Elasticity (adimensional) | Stickiness (kg m s$^{-2}$) | Cohesiveness (adimensional) | Gumminess (kg m s$^{-2}$) | Chewiness (kg) | Resilience (adimensional) |
|---|---|---|---|---|---|---|---|
| COMP1 | 1.741 | 0.805 | −262.956 | 0.377 | 0.655 | 0.526 | 0.069 |
| QUMP | 2.199 | 0.331 | −49.669 | 0.23 | 0.505 | 0.167 | 0.054 |
| COMP3 | 4.288 | 0.776 | −0.416 | 0.35 | 1.388 | 1.073 | 0.132 |
| QBAV | 4.601 | 0.9 | −11.801 | 0.733 | 3.373 | 3.033 | 0.441 |
| COMP4 | 1.07 | 0.724 | −105.861 | 0.385 | 0.414 | 0.304 | 0.101 |

TABLE 1-continued

Texture profiles of some food compositions of the invention and of similar commercial products

|  | Hardness (kg m s$^{-2}$) | Elasticity (adimensional) | Stickiness (kg m s$^{-2}$) | Cohesiveness (adimensional) | Gumminess (kg m s$^{-2}$) | Chewiness (kg) | Resilience (adimensional) |
|---|---|---|---|---|---|---|---|
| CPH | 2.894 | 0.878 | −252.661 | 0.571 | 1.654 | 1.453 | 0.202 |
| FHRAH | 5.732 | 0.992 | −1731.898 | 0.424 | 2.43 | 2.412 | 0.027 |
| ND | 0.593 | 0.9 | −91.307 | 0.807 | 0.478 | 0.431 | 0.246 |
| COMP5 | 0.967 | 0.947 | −370.728 | 0.773 | 0.773 | 0.731 | 0.023 |
| TCH | 5.947 | 0.954 | −167.712 | 0.545 | 3.239 | 3.091 | 0.225 |
| COMP6 | 3.778 | 0.958 | −698.912 | 0.466 | 1.762 | 1.688 | 0.025 |
| CG | 4.667 | 0.774 | −1233.558 | 0.409 | 1.949 | 1.897 | 0.025 |

COMP 1: Egg white hydrolysate with sugar and lemon-lime infusion (precipitate), cheese spread; QUMP: Philadelphia® brand cheese spread; COMP 3: Egg white hydrolysate with salt (precipitate), fresh cheese; QBAV: El Ventero® brand traditional Burgos cheese; COMP 4: Whole egg hydrolysate with sugar and caramel infusion; CPH: Hacendado® brand crème pâtissière; FHRAH: Hacendado® brand authentic egg flan recipe; ND: Danone® brand custard; COMP 5: Yolk hydrolysate with sugar and cinnamon infusion, tocino de cielo; TCH: Hacendado® brand tocino de cielo; COMP 6: Egg white hydrolysate with sugar and honey extract, junket; CG: Junket Goshua® brand.

In the preparation of the analyzed composition, those conditions not specified in the following paragraphs (pH, temperature, centrifugation, etc.) were the ones described in Examples 1 and 2.

COMP1 was obtained from egg white hydrolyzed for 90 minutes. Before enzyme inactivation, sugar and lime-lemon liquid extract were added. After enzyme inactivation centrifugation was carried out and the precipitate was collected, obtaining a product with texture similar to cheese spread, but without including fats or other additives. COMP1 showed low hardness and a high adhesiveness when compared with a commercial cheese spread (QUMP, Philadelphia® cheese, Spain). These results suggest that this product could be softer and it would permit a better tasting.

COMP3 was obtained from egg white hydrolyzed for 90 minutes. In this case, salt was added after enzyme inactivation and then centrifugation was carried out and the precipitate was collected, obtaining a product similar to cottage cheese. This product was compared with a commercial fresh or cottage cheese (QBAV. El Ventero® traditional cheese, Spain). These products had similar hardness and elasticity, but the rest of parameters were higher in the commercial milk-based product.

COMP 4 was obtained from whole egg hydrolyzed for 100 minutes. Before enzyme inactivation sugar and a caramel extract were added and stirred, to obtain a dessert with flavor and texture similar to custard dessert. This product was compared with three commercial products, crème pâtissière (CPH, Hacendado®, Spain), custard dessert (ND, Danone®, Spain) and crème caramel (FHRAH, Hacendado®, Spain). COMP4 was more similar to custard dessert or crème than to crème caramel.

COMP5 was obtained from egg yolk hydrolyzed for 120 minutes, before enzyme inactivation sugar and a cinnamon infusion were added. COMP5 was similar to a Spanish dessert named "tocino de cielo" (TCH, Hacendado®, Spain). COMP5 was creamy, showing lower hardness and higher adhesiveness than the commercial product.

COMP6 was obtained from egg white hydrolyzed for 45 minutes. In this case, before enzyme inactivation, sugar and a honey extract were added and stirred to obtain a dessert with flavor and texture similar to junket or curd, but without fat, milk derived products or other additives included. COMP6 was compared with a commercial junket from ovine milk (CG, Goshua®, Spain). COMP6 showed lower adhesiveness than commercial junket.

EXAMPLE 11

Characterization of the Food Composition of the Invention which is a Foam 500 ml measuring cups were used, in which 30 ml of egg white or egg white hydrolyzed according to the invention were added. The experiment consisted of whipping with a hand-held electric beater at full speed (Braun 600 watt turbo blender) and of measuring the time it took to beat each product and the volume obtained after whipping. Once that time has passed, the drain volume of the foam produced was checked. To that end, the liquid formed at the bottom of the measuring cup was collected at different times with an automatic pipette; the collected volume was placed in a beaker where the volume could be recorded at all times. Once the experiment was performed, the capacity of the liquid drained from the foam to be beat again after a certain time was assessed in each case. Table 2 shows the capacity of the products to be beat again after 24 hours.

TABLE 2

Technical characteristics of the foams of the invention obtained using 30 ml egg white hydrolysate supernatant as an initial volume

|  | Beating time (sec) | Beating volume (ml) | Drain volume (ml) | | | | Capacity to be beat again | Flavor |
|---|---|---|---|---|---|---|---|---|
|  |  |  | 15 min | 30 min | 60 min | 90 min |  |  |
| FLAVOR-PRO 60' | 25 | 220 | 6.5 | 10 | 14 | 14.5 | Yes | Neutral |
| Egg white | 70 | 150 | 3.5 | 7.5 | 12 | 14 | No | Salty |

The invention claimed is:

1. A healthy food composition with a gel or foam texture that is lactose- and casein-free, comprising a neutral-flavored egg protein hydrolysate produced by a method comprising the following steps:
   a) acidifying an egg product pH with a concentrated food grade acid to a pH of between 5.0 and 7.0,
   b) adding an aminopeptidase in an amount of between 1 and 3 g per liter of egg product,
   c) incubating at a temperature of between 45 and 55° C. for a time period of between 30 and 180 minutes, and
   d) inactivating the aminopeptidase at a temperature of between 85 and 95° C. and for a time period of between 10 and 15 minutes,
   wherein the egg product is selected from whole egg, egg white and egg yolk, and wherein the whole egg, egg white or egg yolk is used directly in liquid state or in the form of a rehydrated product (previously dehydrated and then rehydrated), raw or pasteurized.

2. The composition according to claim 1 with a gel texture, where before or after step d) a flavoring agent is added and the mixture is stirred for a period of between 1 and 15 minutes.

3. The composition according to claim 1 with a gel texture, wherein before or after step d) a flavoring agent is added, and after step d) and after adding the flavoring agent, centrifugation at least at 2500 g for a time period of between 10 and 20 minutes is carried out, and the precipitate is collected.

4. The composition according to claim 2, wherein the egg product is liquid whole egg and the composition has a hardness of less than 1.1 kg m s$^{-2}$, elasticity of less than 0.73, stickiness of more than −106 kg m$^2$ s$^{-2}$, cohesiveness of less than 0.39, gumminess of less than 0.42 kg m s$^{-2}$, chewiness of less than 0.31 kg and resilience of less than 0.11.

5. The composition according to claim 2, wherein the egg product is liquid egg yolk, and the composition has a hardness of less than 0.97 kg m s$^{-2}$, elasticity of less than 0.95, stickiness of more than −371 kg m$^2$ s$^{-2}$, cohesiveness of less than 0.8, gumminess of less than 0.78 kg m s$^{-2}$, chewiness of less than 0.74 kg and resilience of less than 0.024.

6. The composition according to claim 3, wherein the egg product is liquid egg white and has a hardness of less than 6.32 kg m s$^{-2}$, elasticity of less than 0.81, stickiness of more than −263 kg m$^2$ s$^{-2}$, cohesiveness of less than 0.57, gumminess of less than 3.2 kg m s$^{-2}$, chewiness of less than 2.4 kg and resilience of less than 0.20.

7. The composition according to claim 1 with a foam texture, wherein the egg product is egg white and wherein before or after step d) a flavoring agent is added, and after step d) centrifugation at least at 2500 g for a time period of between 10 and 20 minutes is carried out, and the supernatant is collected and whipped for a time period of between 25 seconds and 15 minutes.

8. The composition according to claim 1, wherein the aminopeptidase is an aminopeptidase of *Aspergillus oryzae*.

9. The composition according to claim 1, wherein the incubation of step c) is performed for between 45 and 120 minutes.

10. The composition according to claim 1, wherein in step a) the egg product is acidified until reaching pH 5.5 with 37% food grade HCl, in step b) the aminopeptidase is from *Aspergillus oryzae* and is added in a proportion of 2 g per liter of egg product, in step c) the incubation is performed at 50° C. for a time period of between 45 and 120 minutes, and in step d) the aminopeptidase of *Aspergillus oryzae* is inactivated by heating at 95° C. for 10 minutes.

11. A process for producing a neutral-flavored egg hydrolysate, comprising the following steps:
   a) acidifying an egg product pH with a concentrated food grade acid to a pH of between 5.0 and 7.0,
   b) adding an aminopeptidase in an amount of between 1 and 3 g per liter of egg product,
   c) incubating at a temperature of between 45 and 55° C. for a time period of between 30 and 180 minutes, and
   d) inactivating the aminopeptidase at a temperature of between 85 and 95° C. and for a time period of between 10 and 15 minutes,
   wherein the egg product is selected from whole egg, egg white and egg yolk, and wherein the whole egg, egg white or egg yolk is used directly in liquid state or in the form of a rehydrated product (previously dehydrated and then rehydrated), raw or pasteurized.

12. A process for producing a healthy food composition with a gel texture that is lactose- and casein-free, comprising the following steps:
   producing the neutral-flavored egg hydrolysate according to claim 11, and, before or after step (d) adding a flavoring agent and stirring the mixture for a period of between 1 and 15 minutes.

13. A process for producing a healthy food composition with a gel texture that is lactose- and casein-free, comprising the following steps:
   producing the neutral-flavored egg hydrolyrate according to claim 11, and before or after step (d), comprising a step c1) or d1) of adding a flavoring agent and, after step d) or d1), respectively, comprising a step:
   e) centrifuging at least at 2500 g for a time period of between 10 and 20 minutes and collecting the precipitate.

14. A process for producing a healthy food composition with a foam texture that is lactose- and casein-free, comprising the following steps:
   a) acidifying an egg product pH with a concentrated food grade acid to a pH of between 5.0 and 7.0, wherein the egg product is egg white, used directly in liquid state or in the form of a rehydrated product (previously dehydrated and then rehydrated), raw or pasteurized,
   b) adding an aminopeptidase in an amount of between 1 and 3 g per liter of egg product,
   c) incubating at a temperature of between 45 and 55° C. for a time period of between 30 and 180 minutes,
   d) inactivating the aminopeptidase at a temperature of between 85 and 95° C. and for a time period of between 10 and 15 minutes, and wherein, before or after step d) comprises a step c1) or d1), respectively, of adding a flavoring agent and, after step d) or c1), respectively, comprises steps:
   e) centrifuging the product obtained in step d) at least at 2500 g for a time period of between 10 and 20 minutes and collecting the supernatant, and
   f) whipping the supernatant collected in step e) for a time period of between 25 seconds and 15 minutes.

15. The process according to claim 11, wherein the aminopeptidase is an aminopeptidase of *Aspergillus oryzae*.

16. The process according to claim 11, wherein the incubation of step c) is performed for between 45 and 120 minutes.

17. The process according to claim 11, where in step a) the egg product is acidified until reaching pH 5.5 with 37% food grade HCl, in step b) the aminopeptidase is from *Aspergillus oryzae* and is added in a proportion of 2 g per liter of egg product, in step c) the incubation is performed at 50° C. for a time period of between 45 and 120 minutes, and in step d) the aminopeptidase of *Aspergillus oryzae* is inactivated by heating at 95° C. for 10 minutes.

18. Egg hydrolysate produced by the method of claim 11, which has neutral flavor.

19. Food product comprising a composition according to claim 1.

* * * * *